United States Patent
Scholes et al.

(10) Patent No.: US 8,950,684 B1
(45) Date of Patent: Feb. 10, 2015

(54) FLUORESCENT BARCODE FOR IDENTIFICATION

(75) Inventors: Dallas S. Scholes, Buckley, WA (US); Karen M. Etzkorn, Saint Louis, MO (US); Eric P. Oman, Lake Saint Louis, MO (US)

(73) Assignee: The Boeing Company, Chicago, IL (US)

( * ) Notice: Subject to any disclaimer, the term of this patent is extended or adjusted under 35 U.S.C. 154(b) by 775 days.

(21) Appl. No.: 12/910,877

(22) Filed: Oct. 25, 2010

(51) Int. Cl.
*G06K 19/06* (2006.01)

(52) U.S. Cl.
USPC .......................................... 235/494; 235/491

(58) Field of Classification Search
CPC ................. H01L 2224/48091; G02B 5/0242; G02B 5/0278; G02B 3/0006; G02B 5/0294; G02B 5/124; G02B 5/223; G02F 1/133604; G02F 1/133606; C12Q 2563/155; C12Q 1/6834; C12Q 2563/143; C12Q 1/6837; G06Q 30/02; B82Y 5/00; B82Y 20/00; A61K 49/0043; A61K 49/0093; A61K 31/315; G06K 19/0684; G06K 7/1408

USPC .................. 235/462.1, 494, 375, 491, 462.01
See application file for complete search history.

(56) References Cited

U.S. PATENT DOCUMENTS

| | | | | |
|---|---|---|---|---|
| 5,813,423 A * | 9/1998 | Kirchgeorg | ............... | 128/202.28 |
| 7,981,695 B2 * | 7/2011 | Schultz et al. | ................ | 436/525 |
| 2006/0237541 A1 * | 10/2006 | Downing | ................. | 235/462.01 |
| 2007/0205328 A1 * | 9/2007 | Iverson et al. | ............. | 244/135 R |
| 2008/0145777 A1 * | 6/2008 | Iftime et al. | .................... | 430/114 |
| 2009/0302235 A1 * | 12/2009 | Himmelhaus | ............... | 250/458.1 |
| 2010/0062194 A1 * | 3/2010 | Sun | ................................ | 428/29 |
| 2010/0117350 A1 * | 5/2010 | Auslander et al. | .............. | 283/85 |
| 2011/0101240 A1 * | 5/2011 | Barbera-Guillem | ........ | 250/459.1 |
| 2011/0192906 A1 * | 8/2011 | Wilds et al. | .................. | 235/468 |
| 2011/0250410 A1 * | 10/2011 | Rygas et al. | ............... | 428/195.1 |

* cited by examiner

*Primary Examiner* — Sonji Johnson
(74) *Attorney, Agent, or Firm* — Ameh IP; Lowell Campbell; Elahe Toosi

(57) ABSTRACT

Identification marking systems and methods are disclosed. A symbolic surface cover comprises coded information. The symbolic surface cover shows a first image thereof in response to a first electromagnetic excitation and a second image thereof comprising the coded information in response to a second electromagnetic excitation.

26 Claims, 6 Drawing Sheets

FLUORESCENT BARCODE FOR IDENTIFICATION

FIELD

Embodiments of the present disclosure relate generally to identification marks. More particularly, embodiments of the present disclosure relate to coded identification marks.

BACKGROUND

Optical machine-readable representations of data may be used for identification. Many optical machine-readable representations of data are in a form of optical 1-dimensional and 2-dimensional codes. Optical 1-dimensional codes, generally known as barcodes, are optical machine-readable representations of data. Commonly known examples of barcodes are universal product codes (UPC), which show data identifying certain products. 1-dimensional barcodes generally represent data in widths and spacing of parallel lines. Optical 2-dimensional codes, also generally known as barcodes, use patterns of symbols, for example but without limitation, squares, dots, hexagons, geometric patterns, and the like. Examples of a 2-dimensional barcode are Quick Response (QR) Codes. QR codes are 2-dimensional matrix squares of encoded blocks on a white background. Barcodes can be encoded information such as numbers, text, URLs, and the like, and can be read by optical scanners called barcode readers, QR scanners, mobile camera phones, imaging devices, and the like.

SUMMARY

A system and method identifies an object using a fluorescing marker coupled with a nanoparticle based encryption tracer. The fluorescing marker may be used on, for example but without limitation, aircraft, cargo vehicles, ground vehicles, parts, sub-assemblies, assemblies, and the like. An aircraft may be identified as part of a refueling operation. Identification information is captured for on-board or off-board processing and decision-making. The fluorescing marker can be added to a product at any time during or after production, and can be updated as situations dictate. The fluorescing marker operates in substantially all weather conditions and lighting environments. Addition of nanoparticles provide a secure identification process. The fluorescing marker is more environmentally friendly as it does not require development of computer chips or batteries which may be subject to non-optimum operation and are not environmentally friendly to dispose of. In addition, the fluorescing marker can be read from significant distances and more efficiently.

In a first embodiment, an identification marking system comprises a symbolic surface cover comprising coded information. The symbolic surface cover is operable to show a first image thereof in response to a first electromagnetic excitation and to show a second image thereof comprising the coded information in response to a second electromagnetic excitation.

In a second embodiment, a method for identification marking provides a symbolic surface cover comprising coded information. The method further shows a first image of the symbolic surface cover in response to a first electromagnetic excitation. The method further shows a second image of the symbolic surface comprising the coded information in response to a second electromagnetic excitation.

In a third embodiment, a method for using an identification marking system provides a symbolic surface cover comprising coded information. The symbolic surface cover is operable to show at least one ambient image in response to a first electromagnetic excitation and to show at least one information image comprising the coded information in response to at least one reader electromagnetic excitation. The method further radiates the symbolic surface cover with the at least one reader electromagnetic excitation, and reads the coded information from the at least one information image.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to barcode design, fluorescent technologies, barcode readers, nanoparticles, and other functional aspects of the systems (and the individual operating components of the systems) may not be described in detail herein. In addition, those skilled in the art will appreciate that embodiments of the present disclosure may be practiced in conjunction with a variety of computational machines, and that the embodiments described herein are merely example embodiments of the disclosure.

Embodiments of the disclosure are described herein in the context of a practical non-limiting application, namely, identifying a refueling aircraft. Embodiments of the disclosure, however, are not limited to such refueling aircraft, and the techniques described herein may also be utilized in other applications. For example but without limitation, embodiments may be applicable to identification of merchandise, cargo, ground vehicles, ships, parts, sub-assemblies, assembly interactions, and the like.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Identification of objects is necessary for many manufacturing and operational activities. Being able to identify a particular item as it is passing a specific location and then coupling this information together to make operational decisions can be a critical need for many applications. Barcodes may be used for identifying objects.

Figure 1:
FIG. 1 is an illustration of an exemplary UPC barcode.

FIG. 1 is an illustration of an exemplary UPC barcode 100. The UPC barcode 100 is an example of a 1-dimensional barcode. Barcodes have been used in applications such as grocery stores, shipping containers, and asset tracking. Mapping between messages and barcodes is called a symbology. Specification of a symbology comprises an encoding of a digit/character of a message as well as a start and stop markers into bars and spaces. A size of a buffer zone required before and after the barcode as well as a computation of a checksum may also comprise a part of the symbology. Bar code symbologies may comprise, for example but limitation, linear symbologies, two-width symbologies, many-width symbologies, interleaving symbologies, stacked symbologies, and the like. Linear symbologies may be classified by continuous and discrete symbologies. Characters in continuous symbologies generally abut each other, with one character ending with a space and a next character beginning with a bar or vice versa. Characters in discrete symbologies begin and end with bars, and intercharacter space is ignored if not wide enough to look like the code ends. Bars and spaces in the two-width symbologies are wide or narrow. Bars and spaces in the many-width symbologies are all multiples of a basic width called a module, and most such codes use four widths of 1, 2, 3 and 4 modules. In the interleaving symbologies, the first character is encoded using black bars of varying width. The second character is then encoded, by varying the width of the white spaces between these bars. Thus characters are encoded in pairs over the same section of the barcode. The stacked symbologies consist of a given linear symbology repeated vertically in multiple. The linear symbologies are optimized to be read by a laser scanner, which sweeps a beam of light across the barcode in a straight line, reading a slice of the barcode light-dark patterns. Imaging does not require moving parts, like a laser scanner does. In 2007, linear imaging was surpassing laser scanning as the preferred scan engine for its performance and durability. The stacked symbologies are also optimized for laser scanning, with the laser making multiple passes across the barcode.

Figure 2:
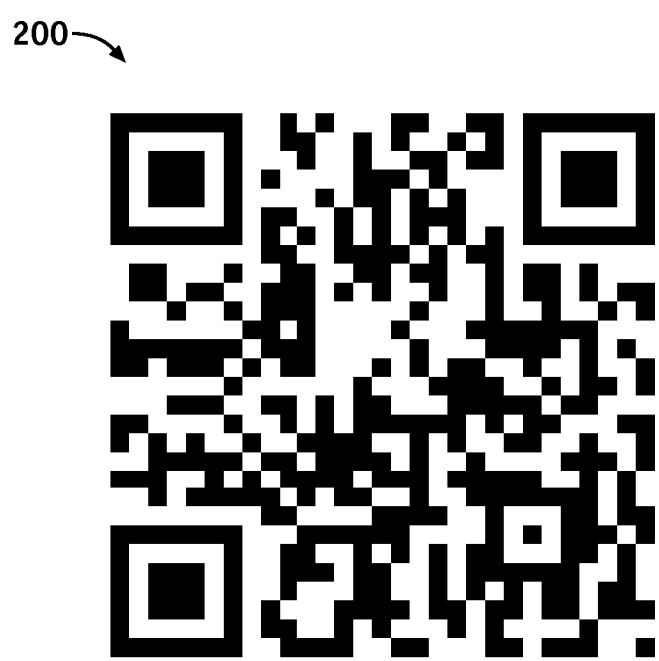
FIG. 2 is an illustration of an exemplary QR barcode.

FIG. 2 is an illustration of an exemplary QR barcode 200. The QR barcode 200 is an example of a 2-dimensional (2D) barcode. There is a large variety of 2D symbologies. The most common are matrix codes, which feature square or dot-shaped modules arranged on a grid pattern. The 2-D symbologies also come in a variety of other visual formats. Aside from circular patterns, there are several 2-D symbologies which employ steganography by hiding an array of different-sized or shaped modules within a user-specified image. The 2-D symbologies generally are not read by a laser as there is generally no sweep pattern that can encompass the entire symbol. Generally 2-D symbologies are scanned by an image-based scanner employing a digital camera sensor technology.

An ability to read a barcode can be limited by a size of a barcode and an ability to distinguish the barcode from its background. Many types of bar-codes can be read from significant distances. However, barcodes are constrained by a lack of light, and also an excess of light (e.g., sunlight) that is too intense thereby eliminating an ability to discriminate the barcodes. Embodiments of the disclosure are substantially fully functional in, for example but without limitation, all-weather applications, and during night and during limited lighting events. Embodiments manipulate a specialized coating material such as a fluorescent coating on a surface of an object to create a unique identification marking (coded information) through excitation of the specialized coating.

Figure 3:
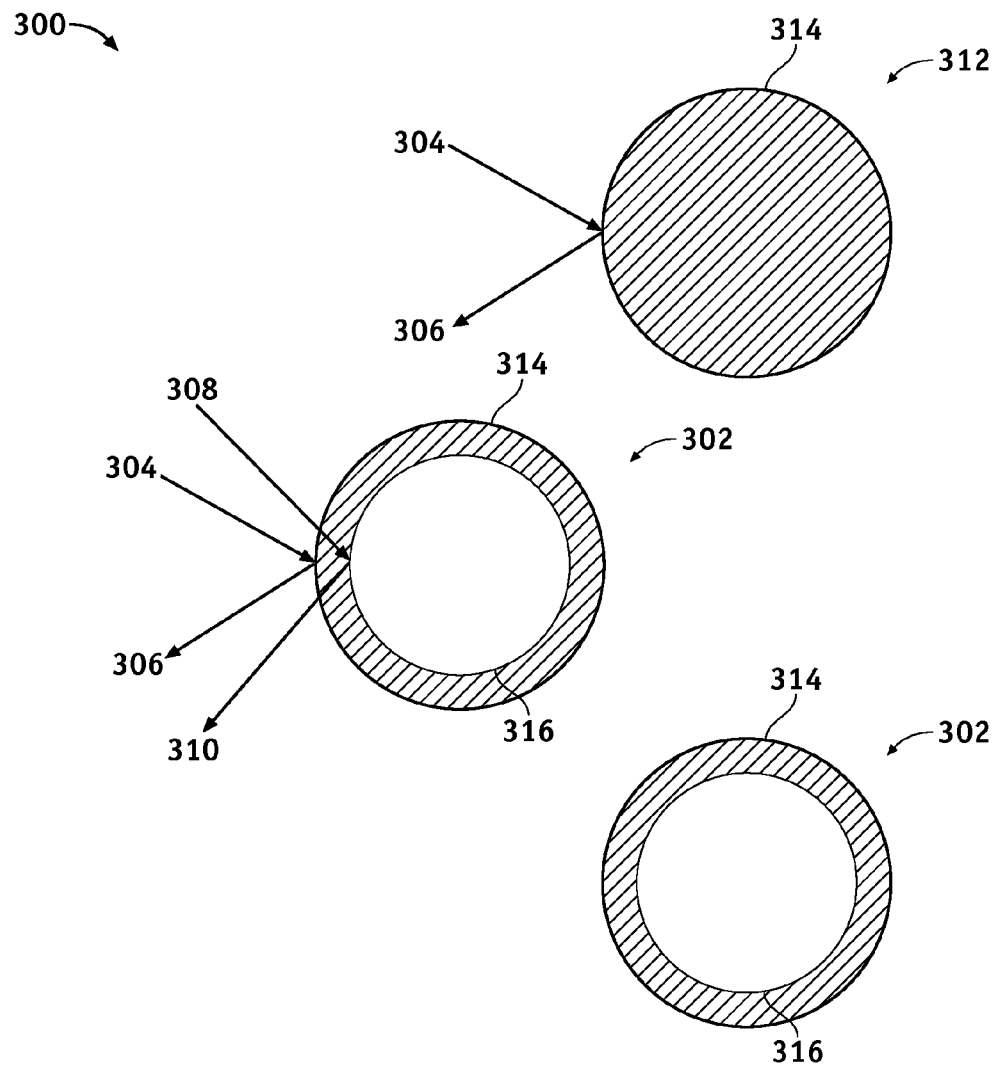
FIG. 3 is an illustration of an exemplary fluorescent particle of an identification marking according to an embodiment of the disclosure.

FIG. 3 is an illustration of an exemplary fluorescent particle 302 of an identification marking 300 according to an embodiment of the disclosure. A coating electromagnetic beam 304 at a first electromagnetic excitation incidents a coating material 314 of the fluorescent particle 302 and reflects a reflected coating electromagnetic beam 306 at a coating electromagnetic frequency. An inner electromagnetic beam 308 at a second electromagnetic excitation incidents a fluorescent core 316 (inner material) of the fluorescent particle 302 and reflects a reflected inner electromagnetic beam 310 at a fluorescent electromagnetic frequency. A non-fluorescent particle 312 may also receive the coating electromagnetic beam 304 at the first electromagnetic excitation and reflect the reflected coating electromagnetic beam 306 at the reflected coating electromagnetic frequency. The first electromagnetic excitation may comprise, for example but without limitation, ambient light, and the like. The second electromagnetic excitation may comprise, for example but without limitation, ultra violet light, infrared light, radio waves, and the like.

An identification marking such as the identification marking 300 can be formed by selective application of the fluorescent particle 302 and the non-fluorescent particle 312 in a symbolic pattern (e.g., the UPC barcode 100 or the QR barcode 200). A radiation such as the coating electromagnetic beam 304 may cause an appearance of the identification marking 300 (e.g., the UPC barcode 100 or the QR barcode 200) for a predetermined amount of time that can then be used to not only identify an object but to overcome a requirement for silicon based Automated Information Technologies (AIT).

The fluorescent core 316 may comprise a fluorescent material. Molecules can be designed to fluorescence at a given electromagnetic frequency. Fluorescence may comprise a molecular phenomenon comprising an emission of a first electromagnetic beam by a substance that has absorbed a second electromagnetic beam of a different wavelength from the first electromagnetic beam. Absorption of an electromagnetic beam of a smaller wavelength can generally induce emission of light with a longer wavelength (lower energy). This process is known as excitation and emission. Most fluorochromes have well-defined bands of excitation and emission. The spectral distribution of emitted light may be largely independent from the excitation wavelength. In an embodiment, excitation of fluorochromes in an infrared radiation (IR) band may be utilized.

The fluorescence may be caused by, for example but without limitation, excess electron energy within a particular molecule at a discrete energy wavelength, and the like. An example may be a molecule that emits energy in the IR band, or other frequency as designed, that could then be read by an optical/mechanical/electrical method to capture an image. An image in a form of an AIT marker (e.g., barcode) may then be translated into an identification of a target item such as an aircraft. Such an image may be processed by an onboard or off-board computer that results in the image translation into data that is then sent to an identification system. In an embodiment, to allow information security such as the security for the data, the fluorescent particle 302 may be injected with a molecular tracing agent such as nanoparticles that ensures that a product is authentic.

Embodiments of the disclosure provide a method for utilizing a combined electromagnetic radiation and passive optical/mechanical/electronic/laser, and the like, reading system to automatically identify an object. As mentioned above, embodiments further provide a secure identification of the object through the addition of nanoparticles. A system for identification marking, as explained in more detail below in the context of discussion of FIG. 4, excites the fluorescent particle 302 in a fluorescent coating, captures the identification marking, stores the identification marking, processes the operational data and then sends the identification marking, along with the operational data to an appropriate information transaction agent as explained in more detail below in the context of discussion of FIG. 8. Fluorescent identification marking enhances identification methodologies because it works at long distances in substantially many non-optimal environmental conditions (e.g. ice, snow, rain, etc.).

Figure 4:
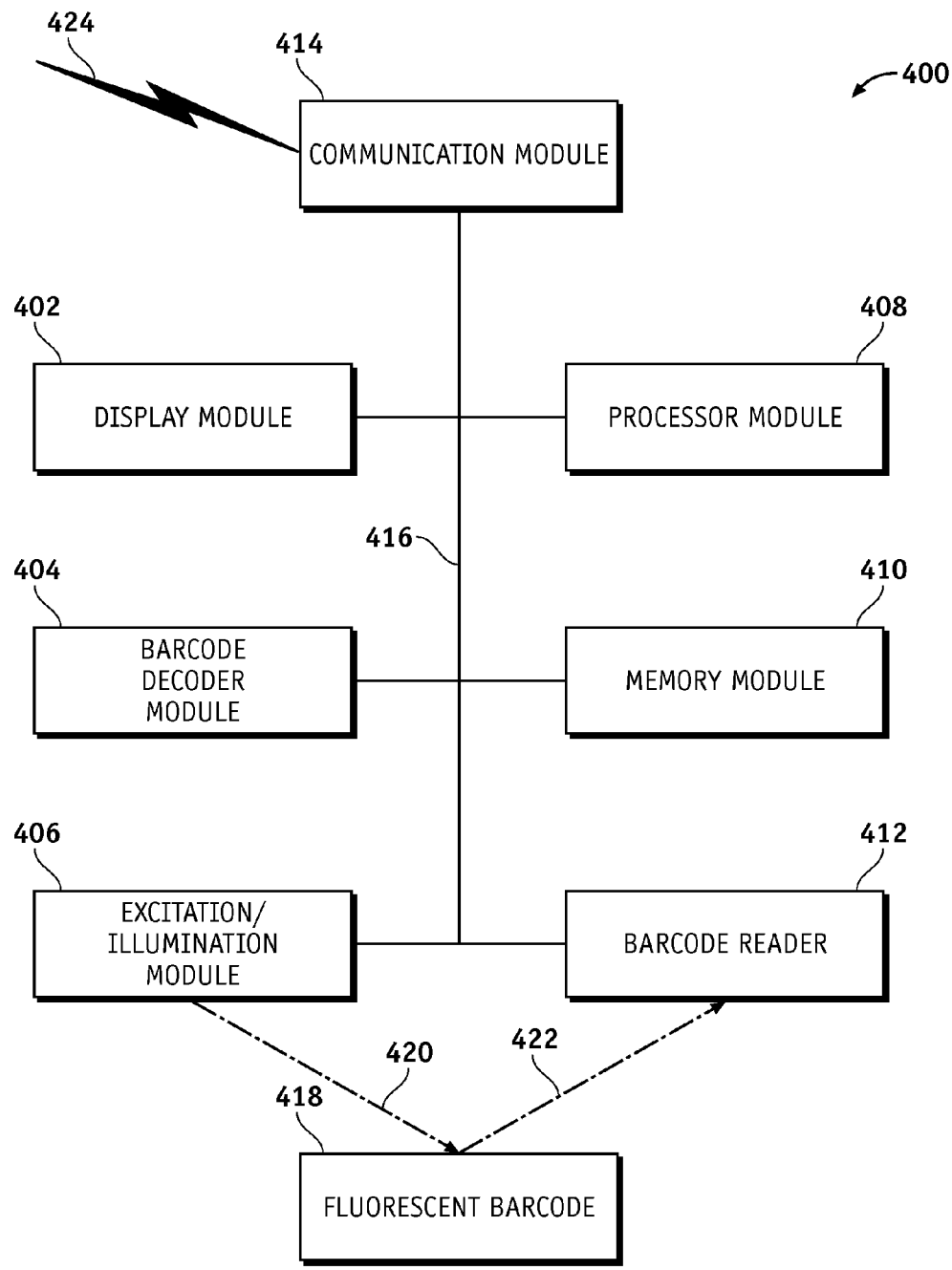
FIG. 4 is an illustration of a functional block diagram of an exemplary identification marking system according to an embodiment of the disclosure.

FIG. 4 is an illustration of a functional block diagram of an exemplary identification marking system 400 (system 400) according to an embodiment of the disclosure. The system 400 may comprise, for example but without limitation, a desktop, a laptop or notebook computer, a hand-held computing device (PDA, cell phone, palmtop, etc.), a mainframe, a server, a client, or any other type of special or general purpose computing device as may be desirable or appropriate for a given application or environment. For example but without limitation, the system 400 may be, part of an aircraft computer, a dedicated system on-board an aircraft, a part of a ground support computer, a dedicated ground system, and the like.

A practical system 400 may comprise any number of communication modules, any number of barcode readers, any number of barcode decoder modules, any number of processor modules, any number of memory modules, any number of fluorescent barcodes, and any number of display modules. The illustrated system 400 depicts a simple embodiment for ease of description. These and other elements of the system 400 are interconnected together via a communication link 416 allowing communication between the various elements of system 400. Those of skill in the art will understand that the various illustrative blocks, modules, circuits, and processing logic described in connection with the embodiments disclosed herein may be implemented in hardware, computer-readable software, firmware, or any practical combination thereof. To illustrate clearly this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present disclosure.

The identification marking system 400 may comprise a display module 402, a barcode decoder module 404, an excitation/illumination module 406, a processor module 408, a memory module 410, a barcode reader 412, a communication module 414, and a symbolic surface cover such as a fluorescent barcode 418.

The excitation/illumination module 406 may comprise, for example but without limitation, a passive electromagnetic emitter, and the like, operable to illuminate a symbolic surface cover such as the fluorescent barcode 418 by radiating an electromagnetic excitation beam 420 (308 in FIG. 3). The excitation/illumination module 406 may be turned on locally via the system 400 or remotely via a remote source, as explained in more detail below in the context of discussion of FIG. 5.

The barcode reader 412 receives a reflected inner electromagnetic beam 422 (310 in FIG. 3) from the fluorescent barcode 418. An identification marking/code can be formed by selective application of the fluorescent particle 302 and the non-fluorescent particle 312 in a symbolic pattern as explained above. While in the embodiment shown in FIG. 3, two types of particles are shown, alternatively any number of particles that selectively respond respectively to a plurality of electromagnetic excitation beams/rays may be used. In this manner, the particles may be used to form a plurality of images (symbolic patterns), each providing a set of information. For example but without limitation, a plurality of images may be used to provide security by each image comprising a subset of a set of information (information subset), such that the set of information may not be decrypted properly by a single subset. In this manner, the unique identification marking/coded information is not decodable without reading the information subsets. Each of the images is activated by a particular electromagnetic excitation. The images may comprises, for example and without limitation, the UPC barcode 100, the QR barcode 200, and the like.

The barcode decoder module 404 receives the identification code from the barcode reader 412, and identifies a target object by decoding the identification code The decoding may be performed by using, for example and without limitation, a UPC barcode decoder, a QR barcode decoder, and the like.

The processor module 408 is configured to support functions of the system 400. For example, the processor module 408 may control operations of the system 400 so that processes of the system 400 are suitably performed. The processor module 408 can control the display module 402 to display information associated with the identification code, and the like. Further, the processor module 408 accesses the memory module 410, for example, to access the identification code and pertinent operational data, such as but without limitation, date, time stamp, and the like, in order to build a transaction electronically for transmission to appropriate decision systems for accurate billing or other forms of data utilization. The processor module 408, may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration. In practice, the processor module 408 comprises processing logic that is configured to carry out the functions, techniques, and processing tasks associated with the operation of system 400. In particular, the processing logic is configured to support, e.g., identification marking and/or electronic transactions described herein.

The memory module 410 may be any suitable data storage area with suitable amount of memory that is formatted to support the operation of the system 400. Memory module 410 is configured to store, maintain, and provide data as needed to support the functionality of the system 400 in the manner described below. The memory module 410 logs and stores/records, for example but without limitation, the barcode information for the identification object based on the coded information, the operational data based on the coded information, and the like. Further, the memory module 410 electronically under control of the processor module 408 packages the barcode information for the identification object along with the operational data pertain to a transaction, and the like, to obtain transaction information. In practical embodiments, the memory module 410 may comprise, for example but without limitation, a non-volatile storage device (non-volatile semiconductor memory, hard disk device, optical disk device, and the like), a random access storage device (for example, static random access memory (SRAM) and dynamic random access memory (DRAM)), or any other form of storage medium known in the art. The memory module 410 may be coupled to the processor module 408 and configured to store, for example but without limitation, an information database, and the like.

The memory module 410 may also store, a computer program that is executed by the processor module 408, an operating system, an application program, tentative data used in executing a program processing, and the like. The memory module 410 may be coupled to the processor module 408 such that the processor module 408 can read information from and write information to memory module 410. As an example, the processor module 408 and memory module 410 may reside in their respective application specific integrated circuits (ASICs). The memory module 410 may also be integrated into the processor module 408. In an embodiment, the memory module 410 may comprise a cache memory for storing temporary variables or other intermediate information during execution of instructions to be executed by the processor module 408.

The display module 402 is configured to display, for example but without limitation, the barcode identification information, the transaction information, and the like. The display module 402 may be formed by, for example but without limitation, an organic electro-luminescence (OEL) panel, liquid crystal panel (LCD), and the like. Various kinds of information can be displayed on the display module 402 via an image/video signal supplied from the processor module 408.

The communication module 414 transmits the transaction information to the appropriate decision systems and/or other systems of record for accurate billing or other forms of data utilization as explained in more detail below. Multiple transactions for multiple operations can be transmitted can be at once.

The transaction may be transmitted to an aircraft computer using a particular communication protocol, a dedicated system on-board an aircraft, a part of a ground support computer, a dedicated ground system, a general purpose mobile computer such as a PDA, a desktop, a dedicated computer on board a vehicle, and the like. The transaction information may be transmitted wirelessly via a wireless communication link 424 through a suitably configured RF antenna (not shown) that supports the particular wireless communication protocol and modulation scheme, or via a suitable wired communication arrangement (not shown).

Figure 5:
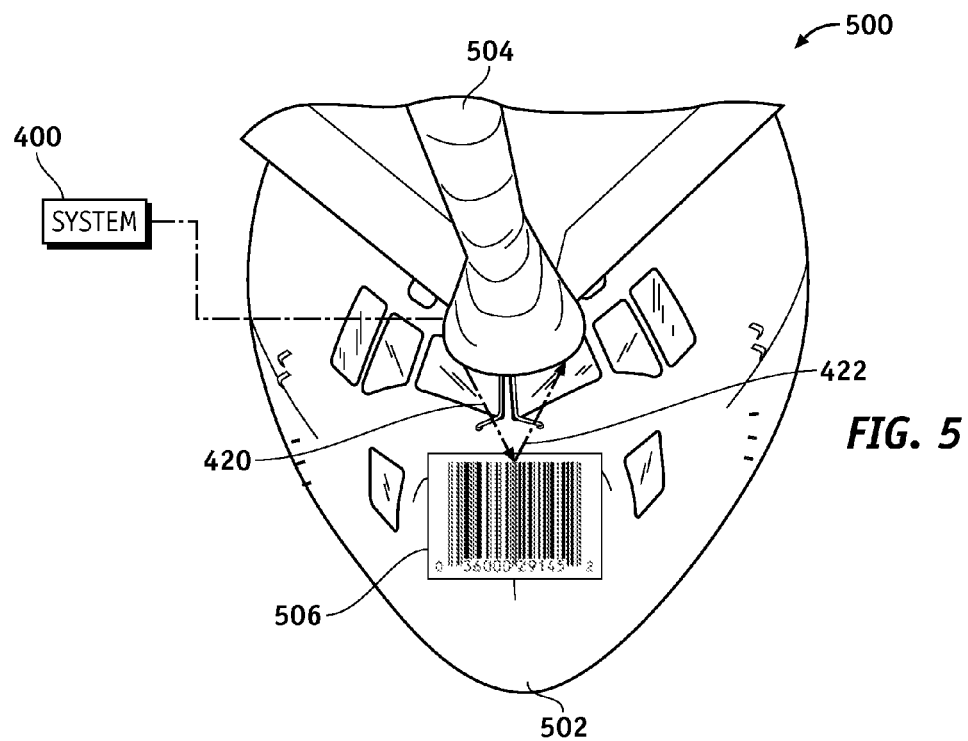
FIG. 5 is an illustration of an exemplary application of a fluorescent barcode comprising an identification tag for a refueling aircraft illuminated by an electromagnetic excitation beam according to an embodiment of the disclosure.

FIG. 5 is an illustration of an exemplary application of a fluorescent barcode 506 comprising an identification tag for a refueling aircraft 502 illuminated by the electromagnetic excitation beam 420 according to an embodiment of the disclosure. The fluorescent barcode 506 is painted on the refueling aircraft 502 and represents the identification of the refueling aircraft 502. The excitation/illumination module 406 of the system 400 is turned on when the refueling aircraft 502 (receiver aircraft) enters an appropriate refueling envelope. Alternatively, the excitation/illumination module 406 may be turned on via a remote control system, such as but without limitation, a ground control system, and the like. The passive electromagnetic emitter of the excitation/illumination module 406 illuminates the fluorescent barcode 506 by radiating the electromagnetic excitation beam 420. An optical reader such as the barcode reader 412 on a tanker aircraft (not shown) coupled to a boom 504 of the tanker aircraft or other appropriate location (not shown) receives a reflected electromagnetic beam 422 from the fluorescent barcode 506 and recognizes the fluorescent barcode 506. Once operational data such as refueling data is collected from the receiver aircraft, the passive electromagnetic emitter is then disabled in accordance with standard process and procedures. Data comprising identification information of the refueling aircraft 502, and transaction information, collected during refueling operation is stored in the memory module 410 along with the other pertinent information collected during the refueling operation. An appropriate transaction can then be electronically built and transmitted to a billing system and/or other pertinent tracking systems via the communication module 414. Data security of the system 400 is maintained on the tanker aircraft or other system ensuring substantially 100 percent accuracy of accounting transactions. The identification utilized by the system 400 relies on a proven barcode reading capability and automates the verification of receiver aircraft authorized to receive fuel.

Figure 6:
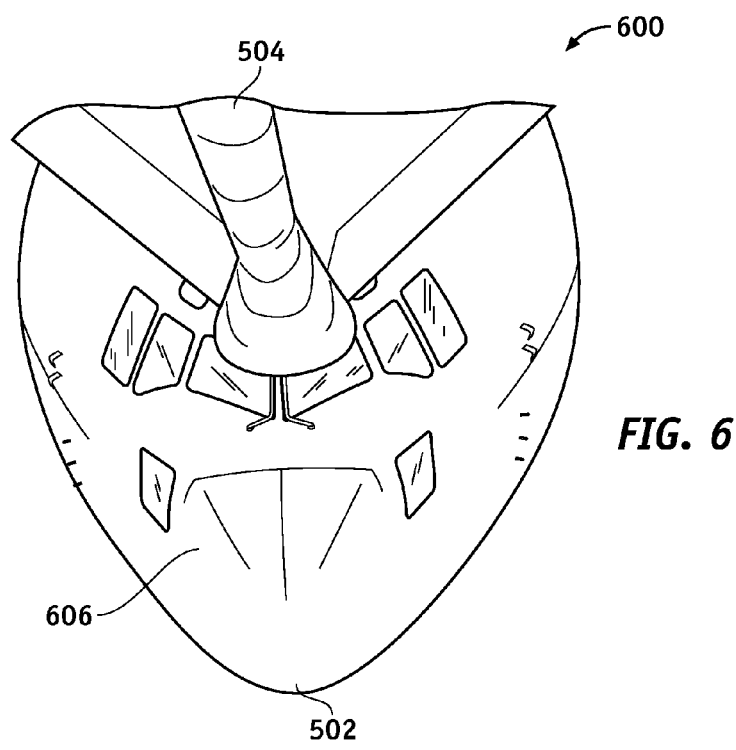
FIG. 6 is an illustration of the fluorescent barcode and the refueling aircraft of the FIG. 5 wherein the fluorescent barcode is not illuminated by the electromagnetic excitation beam according to an embodiment of the disclosure.

FIG. 6 is an illustration of the fluorescent barcode 606 and the refueling aircraft of FIG. 5 wherein the fluorescent barcode 606 is not illuminated by the electromagnetic excitation beam 420 according to an embodiment of the disclosure.

Figure 7:
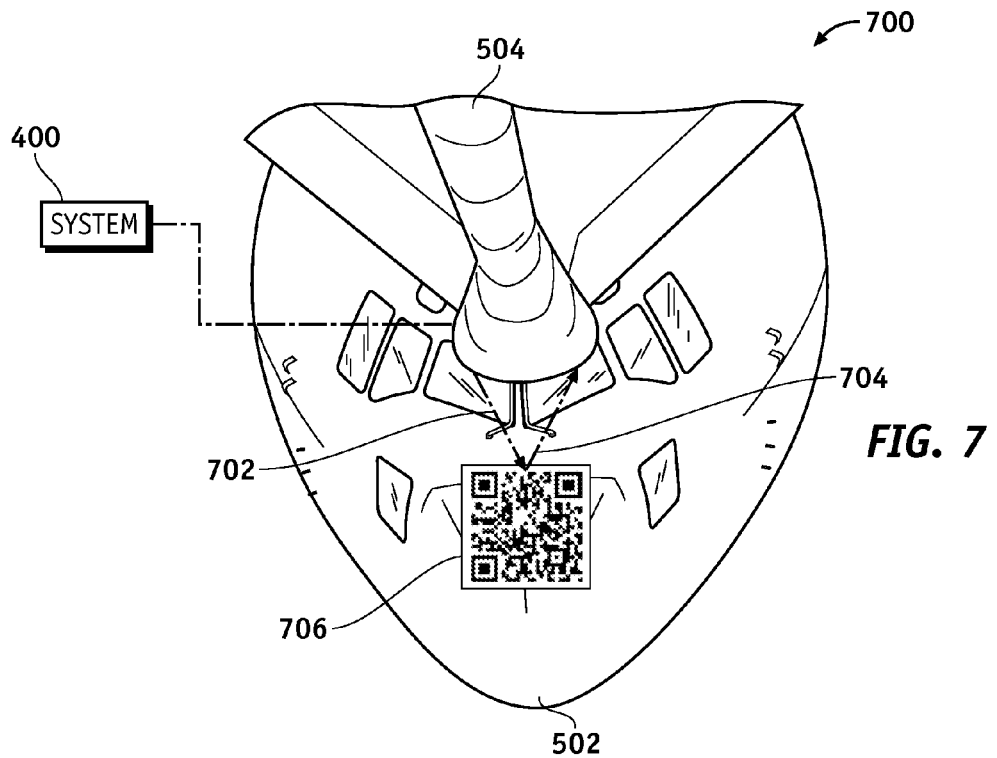
FIG. 7 is an illustration of an exemplary application of a fluorescent barcode comprising an identification tag for a refueling aircraft illuminated by an electromagnetic excitation beam according to an embodiment of the disclosure.

FIG. 7 is an illustration of an exemplary application of a fluorescent barcode 706 comprising an identification tag for a refueling aircraft 502 illuminated by an electromagnetic excitation beam 702 according to an embodiment of the disclosure.

Embodiments of the disclosure extend a target detection distance and eliminate complexity of the components needed to do other various forms of AIT such as RFID. The embodiments provide a new method for creating a unique identification methodology that is secure, stable, reliable and capable of enduring non-desirable climate conditions where computer technology may potentially be non-optimized. While passive RFID has shown an ability to work at a required distances for the boom 504 as well as Probe and Drogue (B/P&D) refueling activities, there is potential for a non-optimal operation of equipment when exposed to extreme temperatures. In contrast, embodiments of the disclosure use florescent particles and can operate in substantially all weather conditions.

Other differences between embodiment of the disclosure and existing solution are as follows: 1) Existing solution rely on some form of AIT technology that may have inherent flaws in performance. 2) Active or passive RFID technology relies on the capability of the silicon chip to absorb enough energy to render it able to reply. This limits the distance that is provided according to the embodiments described herein. 3) Both the active and passive RFID silicon chips need to be encased to protect against lighting strikes, stray voltage, etc. 3) RFID chips greater than 0.5 cm square must pass AS5678 testing (AS5678 testing is described in SAE Standard Reference Number AS5678 published Dec. 14, 2006, relevant content of which is incorporated by reference herein) to prove Federal Aviation Administration (FAA) compliance for RFID chip placement onboard passenger aircraft. 4) RFID is subject to deformation when the tags are hit by objects that can crack the chips, deforms the antenna, etc.

Also, using the existing solution the boom operator manually writes down the tail number and all other pertinent refueling information available to her/him, after flight he/she has to manually enter that information into the appropriate billing system(s), then another person may have to verify the data is accurate and manually reformat the data so that it can be entered into the billing system. In contrast, embodiments provides a more efficient and a more accurate data collection process using the system 400.

Figure 8:
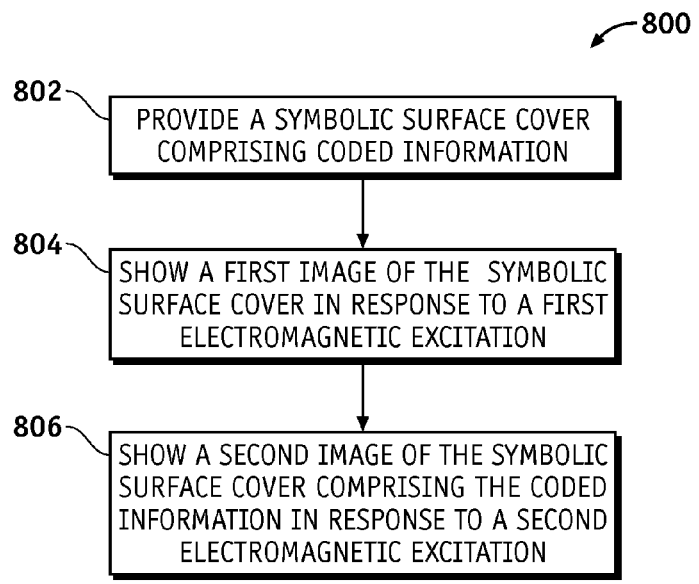
FIG. 8 is an illustration of an exemplary flowchart showing an identification marking process according to an embodiment of the disclosure.

FIG. 8 is an illustration of an exemplary flow chart showing an identification marking process according to an embodiment of the disclosure. The various tasks performed in connection with process 800 may be performed mechanically, by software, hardware, firmware, a computer-readable medium having computer executable instructions for performing the process method, or any combination thereof. The process 800 may be recorded in a computer-readable medium such as a semiconductor memory, a magnetic disk, an optical disk, and the like, and can be accessed and executed, for example, by a computer CPU such as the processor module 408 in which the computer-readable medium is stored. It should be appreciated that process 800 may include any number of additional or alternative tasks, the tasks shown in FIG. 8 need not be performed in the illustrated order, and process 800 may be incorporated into a more comprehensive procedure or process having additional functionality not described in detail herein. For illustrative purposes, the following description of process 800 may refer to elements mentioned above in connection with FIGS. 1-5 and 7. In practical embodiments, portions of the process 800 may be performed by different elements of the system 400 such as: the barcode decoder module 404, the excitation/illumination module 406, the processor module 408, the memory module 410, the barcode reader 412, the communication module 414, and the fluorescent barcode 418/506/706. Process 800 may have functions, material, and structures that are similar to the embodiments shown in FIGS. 1-5 and 7. Therefore common features, functions, and elements may not be redundantly described here.

Process 800 may begin by providing a symbolic surface cover such as the fluorescent barcode 418 comprising coded information (task 802).

The process 800 may continue by showing a first image (e.g., UPC barcode 100) of the symbolic surface cover in response to a first electromagnetic excitation such as the electromagnetic beam 304 (task 804).

The process 800 may continue by showing a second image (e.g., QR barcode 200) of the symbolic surface cover comprising the coded information in response to a second electromagnetic excitation such as the inner electromagnetic beam 308 (task 806).

Figure 9:
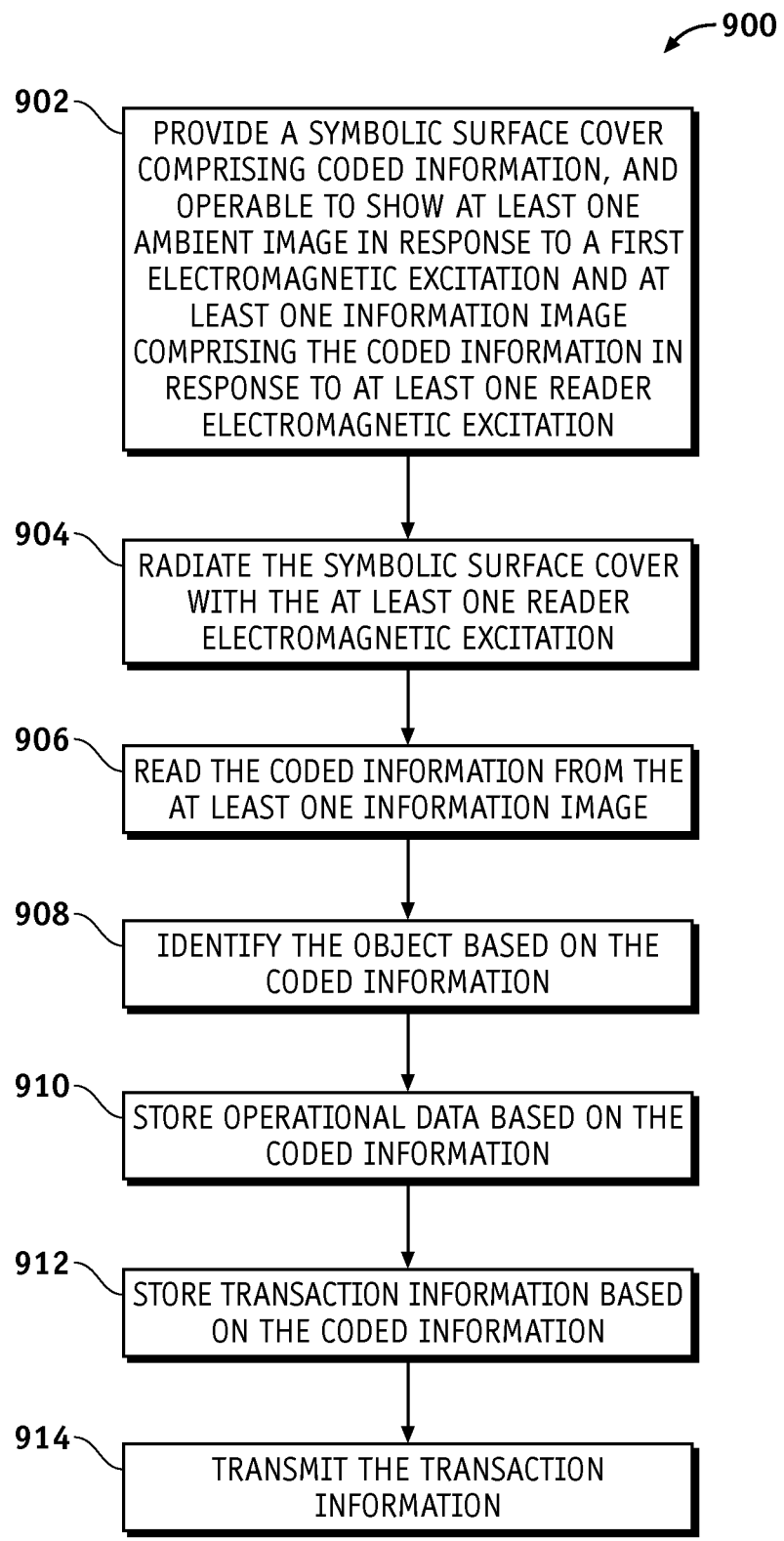
FIG. 9 is an illustration of an exemplary flowchart showing a process for using an identification marking system according to an embodiment of the disclosure.

FIG. 9 is an illustration of an exemplary flow chart showing a process 900 for using the identification marking system 400 according to an embodiment of the disclosure. The various tasks performed in connection with process 900 may be performed mechanically, by software, hardware, firmware, a computer-readable medium having computer executable instructions for performing the process method, or any combination thereof. The process 900 may be recorded in a computer-readable medium such as a semiconductor memory, a magnetic disk, an optical disk, and the like, and can be accessed and executed, for example, by a computer CPU such as the processor module 408 in which the computer-readable medium is stored. It should be appreciated that process 900 may include any number of additional or alternative tasks, the tasks shown in FIG. 9 need not be performed in the illustrated order, and process 900 may be incorporated into a more comprehensive procedure or process having additional functionality not described in detail herein. For illustrative purposes, the following description of process 900 may refer to elements mentioned above in connection with FIGS. 1-5 and 7. In practical embodiments, portions of the process 900 may be performed by different elements of the system 400 such as: the barcode decoder module 404, the excitation/illumination module 406, the processor module 408, the memory module 410, the barcode reader 412, the communication module 414, and the fluorescent barcode 418/506/706. Process 900 may have functions, material, and structures that are similar to the embodiments shown in FIGS. 1-5 and 7. Therefore common features, functions, and elements may not be redundantly described here.

Process 900 may begin by providing a symbolic surface cover such as the fluorescent barcode 418 comprising coded information (task 902). The symbolic surface cover is operable to show at least one ambient image in response to a first electromagnetic excitation such as the (e.g., electromagnetic beam 304 and to show at least one information image comprising the coded information in response to at least one reader electromagnetic excitation such as the inner electromagnetic beam 308. The ambient image may comprise, for example but without limitation, a colored field comprising a same color as a surrounding background color, a logo, an identification mark, and the like. The information image may comprise, for example but without limitation, text, a picture, a 1-dimensional code, a 2-dimensional code, a UPC code, a QR code, and the like.

Process 900 may continue by radiating the symbolic surface cover with the at least one reader electromagnetic excitation (task 904).

Process 900 may continue by reading the coded information from the at least one information image (task 906) as explained above.

Process 900 may then continue, by identifying the object such as the aircraft 502 based on the coded information (task 908) using the barcode reader 412.

Process 900 may then continue by storing operational data based on the coded information (task 910) in the memory module 410. The operational data may comprise, for example but without limitation, date, time stamp, amount of fuel, and the like.

Process 900 may then continue by storing transaction information based on the coded information (task 912) in the memory module 410. In this manner, processor module 408 correlates the identification information of the object (i.e., aircraft 502) and the operational data to build the operational transaction information electronically. For example, the date, the time stamp, the amount of fuel, and the like, may be correlated to the identification information of the object in a database and stored in the memory module 410.

Process 900 may then continue by transmitting the transaction information (task 914) for accurate billing or other forms of data utilization to an appropriate information transaction agent. The information transaction agent fuses the transaction information and then transfers the transaction information to an appropriate on-board/off-board/mobile/stationary decision system of record thereby satisfying, for example, customer requirements. In this manner, process 900 allows both automated and human-in-the-loop decision making activities by an appropriate organization. Process 900 returns the system 400 to its natural state once the radiation such as the inner electromagnetic beam 308 is removed from the fluorescent barcode 418 until the inner electromagnetic ray 308 is excited again for other identification requirements. Excitation and return to the natural state for the identification markings can be repeated numerous times. Information pertaining to multiple transactions can be stored at once for multiple operations.

In this way, embodiments of the disclosure provides an identification marking method using a fluorescent barcode that is more efficient than existing solutions, therefore saves time, and more accurately identifies the target allowing the pertinent information to flow for complete and accurate identification to occur in substantially all environmental conditions. In contrast to existing solutions, the embodiments require no power source on the identification target. The fluorescent barcode can be added to a product at any time during or after production and can be updated as situations dictate. In addition the fluorescent barcode is more environmentally friendly as it does not require the development of computer chips or batteries which are subject to failure and are environmentally non-optimal to dispose of.

In this document, the terms "computer program product", "computer-readable medium", and the like may be used generally to refer to media such as, for example, memory, storage devices, or storage unit. These and other forms of computer-readable media may be involved in storing one or more instructions for use by the processor module 408 to cause the processor module 408 to perform specified operations. Such instructions, generally referred to as "computer program code" or "program code" (which may be grouped in the form of computer programs or other groupings), when executed, enable an identification marking method of the system 400.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-4 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. An identification marking system comprising:
   a symbolic surface cover comprising coded information, and operable to show:
      a first image thereof in response to a first electromagnetic excitation; and
      a second image thereof comprising the coded information in response to a second electromagnetic excitation, and
   the symbolic surface cover comprising a plurality of particles comprising at least one particle type each comprising:
      a coating material covering each particle and operable to reflect a reflected coating electromagnetic radiation in response to the first electromagnetic excitation, the first image comprising only the reflected coating electromagnetic radiation; and
      an inner material within the coating material and operable to reflect a reflected inner electromagnetic radiation in response to the second electromagnetic excitation, the second image comprising only the reflected inner electromagnetic radiation.

2. The identification marking system according to claim 1, wherein the particles comprise nanoparticles.

3. The identification marking system according to claim 1, further comprising a memory module operable to store transaction information and the coded information.

4. The identification marking system according to claim 1, further comprising a communication module operable to transmit transaction information.

5. The identification marking system according to claim 1, wherein the symbolic surface cover is operable in substantially all-weather, at night and during limited lighting events.

6. The identification marking system according to claim 1, wherein the second electromagnetic excitation comprises an infrared light or a radio wave.

7. The identification marking system according to claim 1, wherein the particles comprise two particle types further comprising second type particles each comprising:
   a second coating material covering each particle and operable to reflect a second reflected coating electromagnetic radiation in response to a third electromagnetic excitation; and
   a second inner material within the coating material and operable to reflect a second reflected inner electromagnetic radiation in response to a fourth electromagnetic excitation.

8. The identification marking system according to claim 1, wherein the inner material is operable to reflect the reflected inner electromagnetic radiation in an ultraviolet wavelength for a predetermined amount of time in response to the second electromagnetic excitation.

9. A method for identification marking, the method comprising:
   providing a symbolic surface cover comprising coded information and a plurality of particles comprising at least one particle type each comprising:
      a coating material covering each particle and operable to reflect a reflected coating electromagnetic radiation in response to a first electromagnetic excitation; and
      an inner material within the coating material and operable to reflect a reflected inner electromagnetic radiation in response to a second electromagnetic excitation;
   showing a first image of the symbolic surface cover in response to the first electromagnetic excitation, the first image comprising only the reflected coating electromagnetic radiation; and
   showing a second image of the symbolic surface cover comprising the coded information in response to the second electromagnetic excitation, the second image comprising only the reflected inner electromagnetic radiation.

10. The method according to claim 9, further comprising adding nanoparticles to each of the particles to allow information security.

11. The method according to claim 9, wherein the first electromagnetic excitation comprises ambient light.

12. The method according to claim 9, wherein the second electromagnetic excitation comprises an infrared light or a radio wave.

13. The method according to claim 9, wherein the particles comprise two particle types further comprising second type particles each comprising:
   a second coating material covering each particle and operable to reflect a second reflected coating electromagnetic radiation in response to a third electromagnetic excitation; and
   a second inner material within the coating material and operable to reflect a second reflected inner electromagnetic radiation in response to a fourth electromagnetic excitation.

14. The method according to claim 9, wherein the inner material is operable to reflect the reflected inner electromagnetic radiation in an ultraviolet wavelength for a predetermined amount of time in response to the second electromagnetic excitation.

15. A method for using identification marking, the method comprising:
   providing a symbolic surface cover comprising coded information, and operable to show at least one ambient image in response to a first electromagnetic excitation and to show at least one information image comprising the coded information in response to at least one reader electromagnetic excitation, and
   the symbolic surface cover comprising a plurality of particles comprising at least one particle type each comprising:
      a coating material covering each particle and operable to reflect a reflected coating electromagnetic radiation in response to the first electromagnetic excitation, the at least one ambient image comprising only the reflected coating electromagnetic radiation; and
      an inner material within the coating material and operable to reflect a reflected inner electromagnetic radiation in response to the at least one reader electromagnetic excitation, the at least one information image comprising only the reflected inner electromagnetic radiation;
   radiating the symbolic surface cover with the at least one reader electromagnetic excitation; and
   reading the coded information from the at least one information image.

16. The method according to claim 15, further comprising applying the symbolic surface cover to a surface of an object.

17. The method according to claim 16, wherein the object is an aircraft.

18. The method according to claim 16, further comprising identifying the object based on the coded information.

19. The method according to claim 15, further comprising storing operational data based on the coded information.

20. The method according to claim 15, further comprising storing transaction information based on the coded information.

21. The method according to claim 20, further comprising transmitting the transaction information.

22. The method according to claim 15, wherein:
   the coded information comprises a plurality of information subsets; and
   the at least one information image comprises a plurality of information images each comprising one of the information subsets.

23. The method according to claim 22, wherein the coded information is not decodable without reading the information subsets.

24. The method according to claim 15, wherein the at least one reader electromagnetic excitation comprises an infrared light or a radio wave.

25. The method according to claim 15, wherein the particles comprise two particle types further comprising second type particles each comprising:
   a second coating material covering each particle and operable to reflect a second reflected coating electromagnetic radiation in response to a third electromagnetic excitation; and
   a second inner material within the coating material and operable to reflect a second reflected inner electromagnetic radiation in response to a fourth electromagnetic excitation.

26. The method according to claim 15, wherein the inner material is operable to reflect the reflected inner electromagnetic radiation in an ultraviolet wavelength for a predetermined amount of time in response to the at least one reader electromagnetic excitation.

* * * * *